Robinson & Shepard,
Fruit Box.

No. 87,875.          Patented Mar. 16, 1869.

Witnesses:
Chas. B. Hall
H. Beckwith

Inventors:
Azel T. Robinson
James Shepard

AZEL T. ROBINSON AND JAMES SHEPARD, OF BRISTOL, CONNECTICUT.

Letters Patent No. 87,875, dated March 16, 1869; antedated March 12, 1869.

IMPROVED FRUIT-BOX.

The Schedule referred to in these Letters Patent and making part of the same.

*To all whom it may concern:*

Be it known that we, AZEL T. ROBINSON and JAMES SHEPARD, of Bristol, in the county of Hartford, State of Connecticut, have invented a new and improved Fruit-Box; and we do hereby declare that the following is a full, clear, and exact description thereof, which will enable others skilled in the art to make and use the same, reference being had to the accompanying drawings, making a part of this specification, in which—

Similar letters of reference indicate like parts.

Our invention consists in constructing a box of four completed sides, secured at the corners by flexible loops, thus forming the sides of the box into diamond-shape, for convenience in packing, by means of the bottom resting upon ledges on said sides.

*a a* designate the completed sides of the box, formed of thin upright veneers, and a slat, or cleat to form a ledge, *e*, on each side of the top and bottom of said sides *a a*, for the purpose of strengthening the same, and to support the bottom, A.

A small hole is made in each of the four corners of the completed sides *a a*, and proper laces *c* passed through these holes, and secured so as to form flexible loops *d*, and connect the completed sides *a a*, at the corners, to each other.

Figure 1:
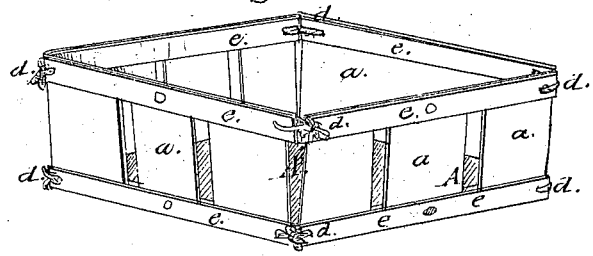
Figure 1 is a perspective view of our invention.
Figure 2:
Figure 2 is an elevation of the edges of the sides of the same, as folded for transportation.

The sides *a a*, thus attached, can then be opened, as shown in fig. 1, or closed, or folded, as shown in fig. 2. If the sides *a a* are made square at the ends, when connected, they will form a box with perpendicular sides; but if the ends of the sides *a a* are bevelled, they will be formed into a flaring box.

Figure 3:
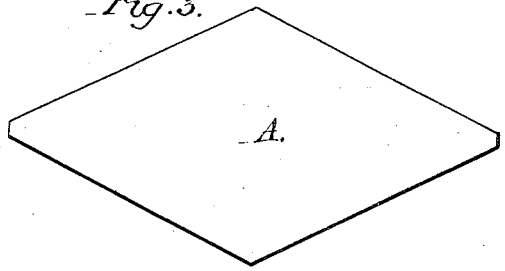
Figure 3 is a top view of the bottom of the same.
Figure 4:
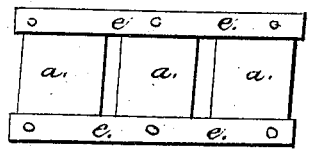
Figure 4 is a front elevation of one of the independent sides of the same.

The bottom, A, fig. 3 is cut of diamond-shape, and packed and shipped to the fruit-grower with the folded sides *a a*, shown in fig. 2. The picker of the fruit takes said sides *a a* and opens them, as shown in fig. 1, and inserts the bottom, A, in the inside, when it will rest on the ledges *e*, and the box is ready to fill.

Figure 5:
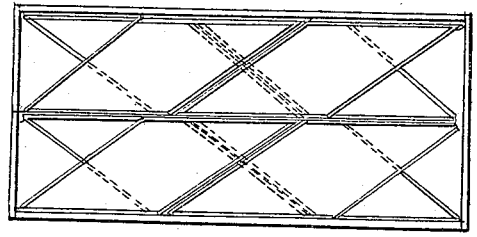
Figure 5 is a top view of two tiers of boxes, of rhombus-form, packed in a crate or box.
Figure 6:
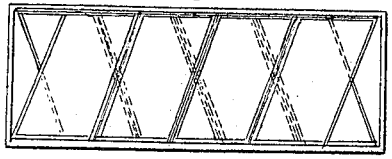
Figure 6 is a top view of two tiers of boxes, of rhomboid-form, as packed in a crate or box.

The convenience of packing a box, of diamond, or rhombus, or rhomboid-form, will be easily understood by carefully studying figs. 5 and 6. The broken lines designate the edges of the under tier of boxes that are under the upper tier. It will be noticed that the edges of the bottom of one tier cross the tops of the others near the corners, and as the bottoms A are elevated, the fruit in the centre is not bruised, although the box may be filled rounding full.

When packed as shown in figs. 5 and 6, two sides of all the boxes are parallel, while the other two sides of all the boxes in each tier cross the sides of the boxes in the tier below it, and consequently the boxes can be shipped about without any danger of their tipping. Any number of rows, either odd or even, can be packed into a box or crate.

By our invention, we produce an article for a fruit-box, which can be packed in a cheap crate, or an ordinary box, without the expense or trouble of trays to place between each tier, and, when empty, can be folded into a small space for transportation. It can be arranged for use by the picker of the fruit. It is strong and durable, neat in its appearance, and furnished at a moderate cost.

What we claim as new, and desire to secure by Letters Patent, is—

In a box composed of the completed sides *a a*, constructed as described, and secured at the corners by flexible loops *d*, forming the box into a rhombus, or rhomboid-shape, for convenience of packing, by means of the bottom, A, resting upon ledges *e* on said sides, substantially as described, and for the purpose herein set forth.

AZEL T. ROBINSON.
JAMES SHEPARD.

Witnesses:
 CHAS. L. HALL,
 H. BECKWITH.